Dec. 10, 1940.  C. E. UNGER  2,224,505
ELECTRIC ABRASIVE PROJECTOR
Filed June 6, 1938   3 Sheets-Sheet 1
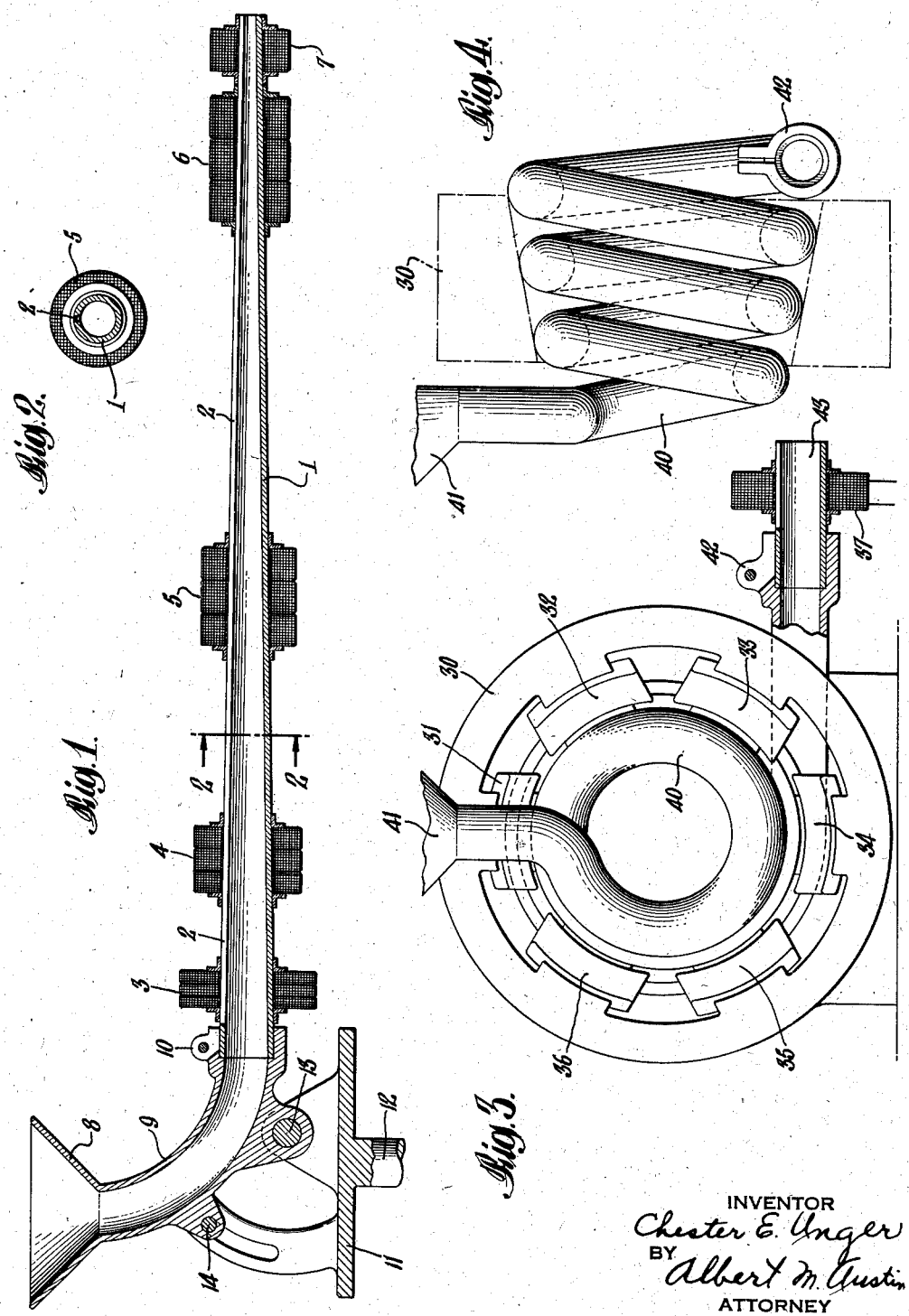
INVENTOR
Chester E. Unger
BY
Albert M. Austin
ATTORNEY Dec. 10, 1940.　　　　C. E. UNGER　　　　2,224,505
ELECTRIC ABRASIVE PROJECTOR
Filed June 6, 1938　　　3 Sheets-Sheet 2
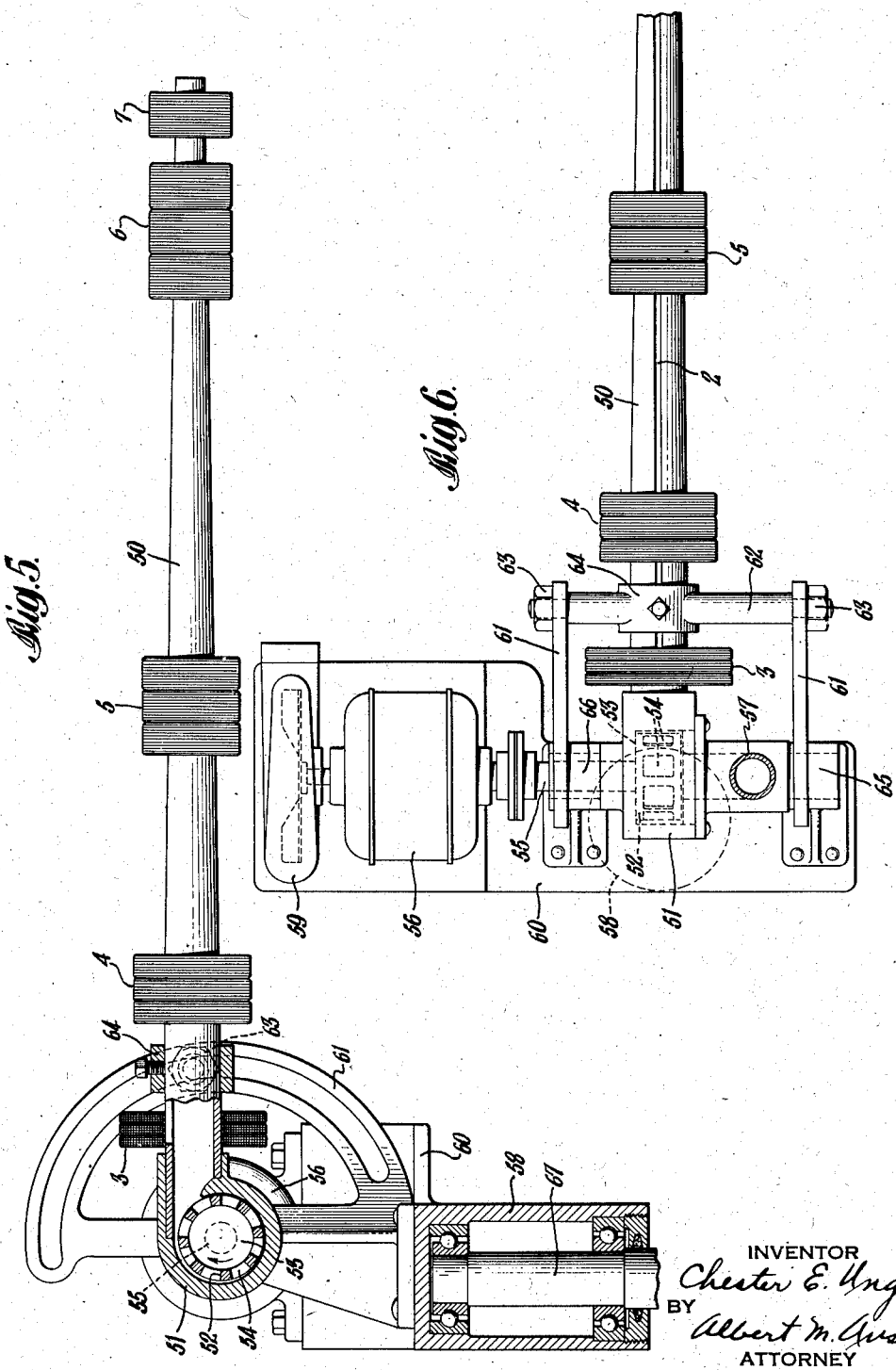

Dec. 10, 1940.    C. E. UNGER    2,224,505
ELECTRIC ABRASIVE PROJECTOR
Filed June 6, 1938    3 Sheets-Sheet 3
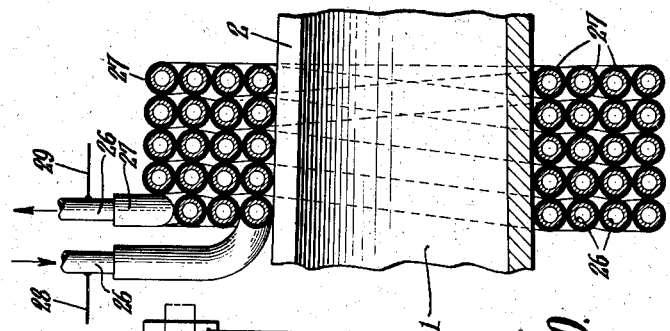
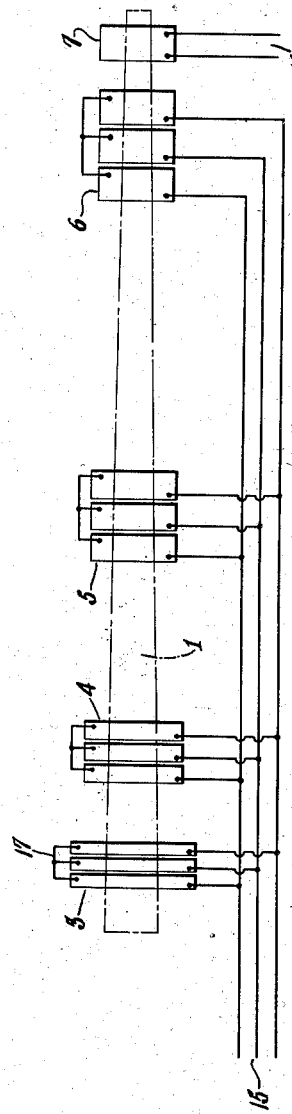
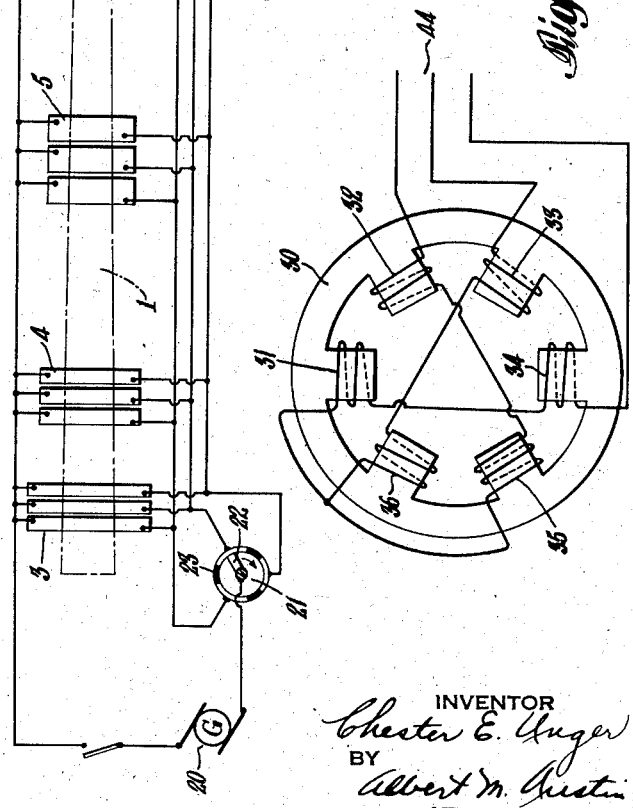
INVENTOR
Chester E. Unger
BY
Albert M. Austin
ATTORNEY Patented Dec. 10, 1940

2,224,505

UNITED STATES PATENT OFFICE 2,224,505

ELECTRIC ABRASIVE PROJECTOR

Chester E. Unger, Mishawaka, Ind., assignor to The American Foundry Equipment Company, Mishawaka, Ind., a corporation of Delaware Application June 6, 1938, Serial No. 211,987

12 Claims. (Cl. 51—9)

The invention relates to cleaning or abrading devices and, more particularly, to such a device in which accelerating force is applied to abrasive particles by the direct action of electrical or magnetic forces.

The invention contemplates the use of metallic, and preferably magnetic, abrasive material, such as steel grit or shot and provides for the generation of a magnetic field which directly influences the particles, accelerating them to proper abrading speed. Preferably, these forces are generated by a traveling magnetic field generated by stationary coils. The magnetic field may be rotary, similar to that used in ordinary induction and synchronous motors, or the magnetic field may move in a straight line. A straight line magnetic field may be generated by the application of multi-phase alternating current to coils properly spaced along a discharge tube. Or, a commutator device may be used for impressing impulses of direct current on coils spaced along the discharge tube, the timing of the impulses and the spacing of the coils being in phase with the desired acceleration of the desired particles.

The rotary field may be used alone for generating the desired abrading speed; the straight tube may be used alone; or both devices may be used together. In any case, a preliminary speed may be applied to the abrasive particles, before subjecting them to the magnetic field, by an auxiliary mechanical throwing device or by gravity.

Suitable devices may be provided for mounting the throwing device for adjusting and controlling the direction of the blast. For example, such structure may provide for movement of the discharge nozzle about both a vertical and a horizontal axis to give wide variation of adjustment.

These electromagnetic projectors may also be used for feeding abrasive to rotary mechanical throwing wheels, such as disclosed in Peik Patent No. 2,104,055, patented Jan. 4, 1938, and may also be used as conveyors for recycling the spent abrasive from the bottom hopper to the throwing wheel.

The invention also consists in certain new and original features of construction and combination of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a longitudinal section of one form of the invention using a straight projector, barrel or tube;

Fig. 2 is a section on the line 2—2 of Fig. 1;

Fig. 3 represents, somewhat diagrammatically, another form of the invention using a spiral or rotary projector tube and utilizing a rotary magnetic field;

Fig. 4 is a side elevation of the projector tube of Fig. 3;

Fig. 5 represents still another form using a straight projector tube and showing a universally adjustable mounting for the tube;

Fig. 6 is a plan view of the construction illustrated in Fig. 5;

Figs. 7 and 8 represent electrical diagrams for the forms shown in Figs. 1 and 5;

Fig. 9 represents an electrical diagram for the form shown in Fig. 3; and

Fig. 10 illustrates a coil construction having provision for cooling.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings and, more particularly, to Fig. 1, the construction shown comprises a relatively long barrel or projector tube 1 tapered from the feed end to the discharge end to correspond to the acceleration of the abrasive as it travels through the tube. The tube is preferably provided with a longitudinal slot 2 at its upper side to cut down the flow of eddy currents and to improve the electrical efficiency. The tube 1 may be of metal or of some non-metallic material which will stand the wear of the abrasive, such as a rubber composition or suitably mounded plastic. If made of metal, manganese steel is desirable as being substantially non-magnetic.

For providing a traveling or progressively moving magnetic field, a series of exciting coils 3, 4, 5 and 6 are provided. The coils are arranged in sets of threes corresponding to three-phase current. The axial dimensions of these coils and their spacing along the barrel correspond to the frequency of the electrical power used and the rate of acceleration it is desired to impart to the abrasive. At the discharge end of the barrel, an additional coil 7 may be provided, preferably being supplied with alternating current of a higher frequency for the purpose of demagnetizing the abrasive as it is discharged from the gun.

For imparting an initial velocity to the abrasive particles as they enter the gun, a gravity feed arrangement may be provided. For this purpose, there is shown in Fig. 1 a hopper 8 secured to a curved conduit 9, which in turn is secured to the gun barrel 1 by a removable coupling 10. It will be understood that the abrasive is fed to the hopper 8 either by hand or by suitable mechanical devices (not shown).

The abrasive gun may be mounted in any desirable manner, depending upon the nature of the work it is to perform. In Fig. 1, there is shown a base 11 to which the fitting 9 has pivot connection 13. An adjustable pin and slot connection, indicated by 14, is provided for varying the angle of elevation of the gun. The base 11 may have a suitable vertical spindle, indicated by 12, suitably mounted to permit swinging the gun about a vertical axis.

Referring now to Fig. 7, a wiring diagram is shown for three-phase current. The coils of each set are connected together as indicated at 17, for example, in set 3. The coil sets are then connected in parallel to a three-phase line, indicated by 15. Demagnetizing coil 7 may be connected separately to another source of electricity, indicated by 16, and having special high frequency to demagnetize the abrasive.

It will be understood that the size of the coils and their spacing along the barrel 1 will depend upon the frequency of the power and upon the acceleration it is desired to impart to the abrasive particles. In general, the farther apart the coils are spaced, the higher the velocity of abrasive travel. The sets may be spaced apart, as indicated in Fig. 7, or the spaces between the sets may be filled in with additional coils having corresponding spacing and size and connected to the three-phase power circuit in the same way.

It will be understood that the three-phase power will set up a traveling or pulsating magnetic field along the length of the barrel 1. This field will act upon the abrasive particles fed thereto, exerting, according to well known electrical laws, a force in a direction along the length of the tube. The abrasive is fed in step with the traveling field and the field will exert an accelerating force on the particles, discharging them at abrading speeds against the work (not shown).

Referring now to Fig. 8, instead of using a three-phase alternating current, a single-phase direct current may be used. Here, the direct current source is indicated at 20. A commutator arrangement is provided comprising stationary commutator segments, indicated by 21, separated by insulation 23. The number of these segments correspond to the number of coils to a set, being three in number. Each segment is connected to a corresponding coil of each set, as indicated in Fig. 8. Cooperating with the commutator is a rotary arm 22 for progressively applying voltage to the coils of each set. As in Fig. 7, the demagnetizing coil 7 is fed with a source of alternating current, indicated by 16.

The size and spacing of the coils in Fig. 8 will be determined by the same laws as explained in connection with Fig. 7. Additional coils may also be used between the coils indicated. As the arm 22 rotates, it will be seen that progressive impulses will be imparted to the coils, forming a progressively traveling field whose speed is determined by the spacing of the coils and by the speed of the rotation of the commutator brush 22. This traveling field will exert a pull on the abrasive particles in accordance with the well known laws of electricity, accelerating the abrasive in step with the traveling wave and discharging the abrasive at abrading velocities.

A suitable cooling arrangement may be provided for controlling the temperature of the coils. Referring to Fig. 10, one form of cooling is illustrated. Here the coil is made of copper tubing, indicated by 26, having suitable insulation 27. A suitable cooling medium, such as water, steam or air, may be circulated through the coil as indicated by the arrows in Fig. 10. The wires 28 and 29 may be secured to the coil for connecting it in its proper place in the circuit. In some cases, the same cooling water may be used for all of the coils without seriously interfering with the difference in potential between coils because of the low electrical conductivity of the cooling medium.

Referring now to Figs. 3 and 4, a rotary magnetic field may be provided for accelerating the abrasive particles. Here the rotary field is caused by a field piece constructed similarly to the fields of well-known synchronous and induction power machines. The field comprises a cylindrical field piece or yoke 30 made of suitable magnetic material and having, in the form shown, six poles. These poles are provided with suitable windings 31-36, inclusive. These windings are connected to a three-phase power line, indicated by 44, as illustrated in Fig. 9. This connection is in accordance with well-known electrical engineering practice and provides a rotary magnetic field within the pole pieces.

Located within the influence of this field, is a spiral tube or conduit, indicated by 40. This conduit is preferably made of non-conducting, non-magnetic material, such as a rubber composition or plastic material. However, in some cases, it may be made of a non-magnetic metal, such as brass or manganese steel, suitably treated to withstand the wear of the abrasive.

The abrasive is fed to the helical conduit 40 by a suitable hopper 41. The abrasive may be fed by hand or by suitable mechanical devices (not shown). The hopper 41 may be located sufficiently above the conduit 40 to impress on the abrasive particles an initial speed. The diameter of the small end of the spiral conduit 40 is preferably determined by the linear speed of the rotating magnetic field at that point. The angular velocity of the rotating magnetic field depends upon the power frequency and is constant, but the linear velocity varies from the center where it is zero to the periphery where it is maximum.

The discharge end of the spiral conduit 40 is provided with a detachable connection 42 and is connected to a discharge nozzle 43 from which the abrasive may be discharged at abrading speeds. The discharge nozzle may be provided with a demagnetizing coil 37 fed with a source of high frequency alternating current for demagnetizing the abrasive particles as they leave the nozzle. Thus, by making the spiral conduit of increasing diameter, the abrasive particles may remain in step with the magnetic field, even though they are linearly accelerated by the well known pulling action that a rotary magnetic field exerts on metallic members influenced thereby.

Referring now to Figs. 5 and 6, a mounting arrangement is shown. Here, the gun, with its exciting coils, is indicated by 50, this construction being similar to the gun described in Fig. 1. The gun 50 is connected to a casing 51 in which is mounted a rotary impeller 52 having one closed end 53 and provided with radial holes 54 and mounted on a shaft 55 secured to drive motor 56. The casing 51 is provided with a feed conduit 57 connected to a suitable hopper or other arrangement by which abrasive may be fed to the machine.

It will be understood that the abrasive is fed to the conduit 57 in any desired manner. The particles enter the center of impeller 52, rotation of which throws the particles through the radial holes 54 into the "breech" of gun 50 with a velocity in step with the traveling magnetic field at that place.

The casing 51 is suitably journalled at 65 and 66 upon a base 60. Secured to the base 60 are stationary sectors 61 having slots in which slide a cross head 62. Cross head 62 has a collar 64 supporting gun 50 and is provided with lock nuts 63 by which the vertical position of the gun 50 may be adjustably determined.

For swiveling the gun 50 about a vertical axis, the base 60 has secured thereto a suitable casing 58 which is swiveled about a vertical shaft 67 mounted upon a suitable support (not shown). Thus, the gun 50 has a universal mounting and may be adjusted about both horizontal and vertical axes. The vertical movement of the gun barrel 50 may be operated either by hand or by suitable mechanical devices (not shown). The adjustable mounting permits the gun to be moved back and forth at any desired speed, this being particularly desirable when cleaning wide sheet stock.

Also mounted upon the base 60, if desired, may be a blower or fan 59 for supplying cooling air for cooling the exciting coils in the manner above described. The fan 59 may be suitably driven by the motor 56.

The arrangements shown in Figs. 1, 3 and 5 may be used as shown, i. e. the abrading speed may be imparted to the abrasive by either the straight gun or the rotary field alone, if desired. Similarly, the initial speed imparted to the abrasive may be obtained either by gravity alone or by a mechanical impeller, such as illustrated in Fig. 5. However, if desired, the rotary field arrangement of Fig. 3, and the straight field arrangement of Fig. 1, may be combined. In this case, it is only necessary to detach the barrel 1 with its coils in Fig. 1 from the detachable connection 10 and substitute it for the nozzle member 43 in Fig. 3. Here, the rotary magnetic field serves to impart a predetermined speed to the abrasive particles while the straight gun increases its speed to the desired value.

Any suitable source of electric power may be used for exciting the coils and driving the electric motor, for example, 110, 220 or 440 volts. Three-phase, sixty cycle power may be used for the exciting coils for both the straight and rotary magnetic fields. Two-phase or any other polyphase power may also be used, as will be understood by those skilled in the art. A higher frequency may be desirable for the demagnetizing coils.

It will be understood that with the coils of the gun shown in Fig. 1 energized either with polyphase alternating current as in Fig. 7, or with interrupted direct current as in Fig. 8, each coil will initiate or impress a separate impulse on the limited amount of moving abrasive within its influence, causing a "spurt" of abrasive. These limited portions of abrasive are progressively accelerated by the impulses of succeeding exciting coils, causing them to travel from the breech toward the muzzle of the gun. Thus, the magnetic field may be said to be a pulsating field, moving as a travelling wave from breech to muzzle. It will be understood that the "spurts" of abrasive will be sufficiently close together to cause a substantially continuous discharge of abrasive from the gun.

The dimensions of the accelerating tubes and of the coils depend upon the volumes and speeds of discharge desired. For example, an output of 300 lbs. per minute at a velocity of 12,000 feet per minute may be achieved. It will be understood that although the apparatus has been indicated in certain positions for purposes of illustration, the positions may be changed. For example, the rotary type shown in Fig. 3 may be positioned with the rotary field rotating about a vertical axis. Therefore, if desired, the various feed spouts may have flexible connections to permit changing the position of the machine. It will be understood that, if desired, suitable devices may be provided for removing the various impurities from the abrasive material so that pure abrasive, having the desired properties, may be fed back into the machine after it has been discharged upon the work.

The above description has been given on the basis of present knowledge of operation of the above described machine. However, the exact theory of operation is somewhat involved and for this reason the explanation of the theoretical operation may not be absolutely correct. It should, therefore be borne in mind that the explanation is given solely to aid in understanding the invention and should not be taken in any limited sense.

While certain novel features of the invention have been disclosed and are pointed out in the annexed claims, it will be understood that various omissions, substitutions and changes may be made by those skilled in the art without departing from the spirit of the invention.

What is claimed is:

1. In a system for creating a blast of abrasive particles for cleaning and the like, a stationary path for the abrasive particles, stationary coils distributed along the length of said path, means for impressing electric voltage impulses on said coils, said coils being so distributed and said impulses being so timed as to create a traveling magnetic field traveling lengthwise of said path, means for feeding magnetic abrasive particles at the inlet end of said path, whereby said particles are accelerated by the action of said traveling magnetic field, means for delivering said particles from the outlet end of said path onto the work, and a demagnetising device at said outlet end to subject said particles to a demagnetising field before contacting the work.

2. In an electric abrasive projector, a substantially rectilinear electric projector member, means for feeding magnetic abrasive material to said projector member, means impressing a traveling magnetic field of force lengthwise of said projector member to impart acceleration to said material lengthwise of said projector member, and means for imparting an initial velocity to said abrasive material before introducing it into said projector member.

3. In an electric abrader, a substantially rectilinear projector member, means for feeding abrasive particles to said member, a series of coils surrounding said member, and means impressing on said coils electric voltage impulses, the spacing of said coils and the timing of said impulses being such as to accelerate the abrasive particles passing along said member, said abrasive particles issuing from the discharge end of said member at abrading speed.

4. In an electric abrader, a substantially rectilinear tubular projector member of non-magnetic, non-conducting material, means for feeding magnetic abrasive particles into one end of said tubular member, a series of coils surrounding said tubular member, means impressing on said coils electric voltage impulses, the spacing of said coils and the timing of said impulses being such as to accelerate the abrasive particles passing through said tube, said abrasive particles issuing from the discharge end of said tube at abrading speed.

5. In an electric abrader, a substantially rectilinear projector member, means for feeding magnetic abrasive particles to said member, a series of coils surrounding said member, means impressing on said coils electric voltage impulses, the spacing of said coils and the timing of said impulses being such as to accelerate the abrasive particles passing along said member, said abrasive particles discharging from the discharge end of said tube at abrading speed, and a demagnetizing coil surrounding the discharge end of said projector member.

6. In a system for creating a blast of abrasive particles for cleaning and the like, a stationary spiral path for the abrasive particles, stationary coils distributed along the length of said path, means for impressing polyphase electric voltage impulses on said coils, said coils being so distributed and said impulses being so timed as to create a rotary magnetic field traveling lengthwise of said path, the inlet of said path being closer to the axis of said magnetic field than the outlet, means for feeding magnetic abrasive particles at the inlet end of said path, whereby said particles are accelerated by the action of said rotary magnetic field, and means for delivering said particles from the outlet end of said path onto the work.

7. In an electric abrading machine, a stationary field piece having a multi-phase winding thereon for establishing a rotary magnetic field, a tubular member forming a spiral path within said field, said member having an inlet and an outlet, said inlet being located substantially closer to the center of said field than said outlet, whereby abrasive material fed to said inlet is accelerated by said magnetic field and discharged through said outlet.

8. In an electric abrading machine, an annular stationary field piece having a multi-phase winding thereon for establishing a rotary magnetic field, a tubular member of non-magnetic non-conducting material forming a spiral path within said field, said member having an inlet for magnetic abrasive material near the center of said field, and having a discharge outlet for discharging said abrasive material at the outer edge thereof, whereby said abrasive material is accelerated by said magnetic field while passing through said tubular member.

9. In an electric abrader, a projector member, a rotary impeller device at the feed end of said projector member, means for introducing magnetic abrasive particles into said rotary impeller device, and means for impressing a magnetic field on said projector member traveling lengthwise thereof to accelerate the abrasive particles received from said impeller device.

10. In an electric abrader, a base, a support mounted on said base for rotation about a vertical axis, a mounting on said support for rotation about a horizontal axis, a discharge tube on said mounting, a rotary impeller device at the feed end of said discharge tube, means for introducing magnetic abrasive particles into said rotary impeller device, and means for impressing a progressively moving magnetic field on said discharge tube to accelerate the abrasive particles received from said impeller device, said discharge tube being adjustable both horizontally and vertically.

11. In an electric abrader, a substantially tubular projector member having a feed end and a smaller discharge end, means for feeding magnetic abrasive material into said feed end, means for impressing a traveling magnetic field of force lengthwise of said projector member to impart acceleration to said abrasive material, the interior cross dimension of said projector member decreasing from said feed end to said discharge end in accordance with the rate of acceleration of the abrasive material.

12. In a system for creating a blast of abrasive particles for cleaning and the like, a stationary path for the abrasive particles, stationary coils distributed along the length of said path, means for impressing electric voltage impulses on said coils, said coils being so distributed and said impulses being so timed as to create a traveling magnetic field traveling lengthwise of said path, means for feeding magnetic abrasive particles at the inlet end of said path, whereby said particles are accelerated by the action of said traveling magnetic field, and means for delivering said particles from the outlet end of said path onto the work.

CHESTER E. UNGER.